United States Patent [19]

Kondo

[11] Patent Number: 4,590,512
[45] Date of Patent: May 20, 1986

[54] CIRCUIT FOR DETECTING THE RATIO OF INTENSITIES OF THE COLOR COMPONENTS OF LIGHT

[75] Inventor: Takashi Kondo, Izumi, Japan

[73] Assignee: Minolta Camera Kabushiki Kaisha, Osaka, Japan

[21] Appl. No.: 596,840

[22] Filed: Apr. 4, 1984

[30] Foreign Application Priority Data

Apr. 4, 1983 [JP] Japan .................................. 58-59713
Jan. 20, 1984 [JP] Japan .................................. 59-9110

[51] Int. Cl.⁴ .......................................................... H04N 9/73
[52] U.S. Cl. .................................................. 358/29; 358/10
[58] Field of Search ....................................... 358/29, 10

[56] References Cited

U.S. PATENT DOCUMENTS 4,281,337 7/1981 Nakamura ............................. 358/29
4,506,290 3/1985 Hashimoto ............................ 358/29

FOREIGN PATENT DOCUMENTS 56-165477 12/1981 Japan .

Primary Examiner—Michael A. Masinick
Attorney, Agent, or Firm—Watson Cole Grindle & Watson

[57] ABSTRACT

A color component ratio detection circuit generates, without use of a logarithmic compression circuit and a logarithmic expansion circuit, a voltage proportional to the ratio between the intensities of first and second color components of light to produce a current proportional to the intensity of the first color component flowing into a photoconductive element for detecting the intensity of the second color component, so that the voltage proportional to the ratio between the intensities of the first and second color components appears across the photoconductive element. A video camera may include the circuit for achievement of automatic white balance.

10 Claims, 9 Drawing Figures

CIRCUIT FOR DETECTING THE RATIO OF INTENSITIES OF THE COLOR COMPONENTS OF LIGHT

BACKGROUND OF THE INVENTION

1. Field of the Invention

This invention relates to a detection circuit for detecting the ratio of the intensities of the color components of light, and particularly relates to such a detection circuit for use in an automatic color temperature adjusting device for a video camera.

2. Description of the Prior Art

Video cameras are known which include an automatic color temperature adjusting device wherein light from a large area of a scene to be photographed is sensed through an optical system independent of the camera objective lens to measure the intensity or the spectral energy of the blue and red components of the light. The color temperature for the picture being taken is automatically adjusted in accordance with the measurements i.e. the measured results.

Figure 1:
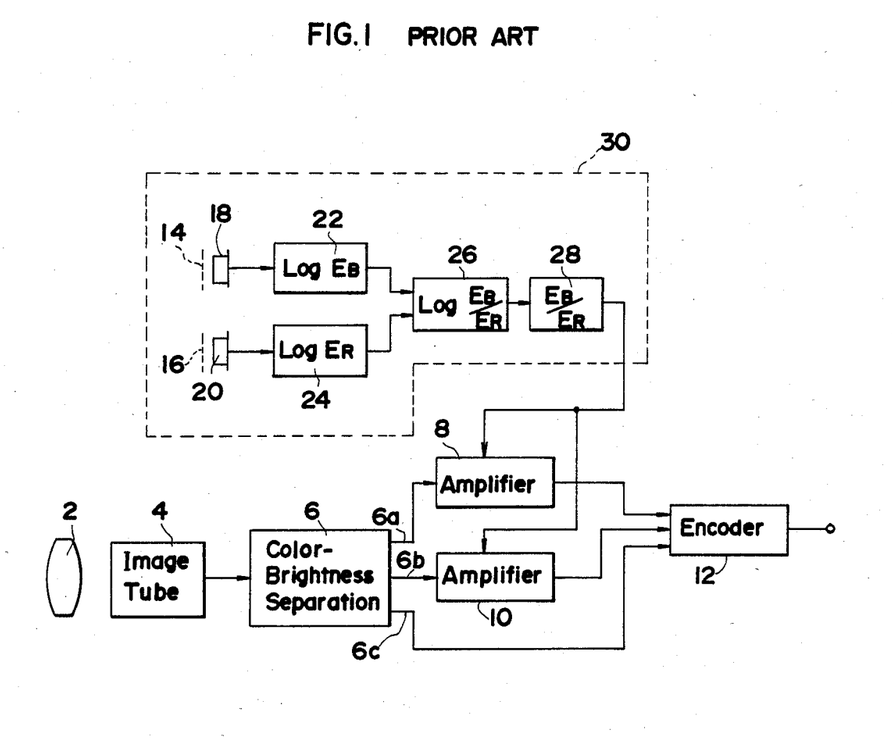
FIG. 1 is a block diagram showing an example of a known video camera circuit equipped with an automatic color temperature adjusting device.

An example of such video cameras is shown in FIG. 1. With reference to FIG. 1, the video camera comprises an objective lens 2, a singular type pickup tube 4, a color-brightness separation circuit 6, a gain adjustable amplifier 8 for the red component, a gain adjustable amplifier 10 for the blue component, and an encoder 12. When the electric signal corresponding to the image of the scene formed by objective lens 2 is produced by pickup tube 4, the electric signal is separated into red, blue and brightness components by the color-brightness separation circuit 6, with the electric signal of each component being output from each output terminal 6a, 6b and 6c of the separation circuit 6. The red and blue component signals output from the output terminals 6a and 6b, respectively, will be input to encoder 12 via gain adjustable amplifier 8 for the red component and gain adjustable amplifier 10 for blue component respectively, while the brightness component signal 6c output from output terminal 6c will be directly input to encoder 12, which in turn converts the above component signals into video signals.

The automatic color temperature adjusting device includes filter 14 which transmits the blue component of the scene light; a filter 16 which transmits the red component of the scene light; photodetectors 18 and 20 which receive the lights passing through filters 14 and 16 and output electrical signals proportional to the intensities thereof; logarithmic compression circuits 22 and 24 for logarithmically compressing the respective electric signals; a subtracting circuit 26 for subtracting one from the other of the signals fed from the respective logarithmic compression circuits 22 and 24; and a logarithmic expansion circuit 28 for logarithmically expanding the output from subtraction circuit 26.

It should be noted that photodetectors 18 and 20 are arranged to receive the light from a larger area of a scene to be photographed than objective lens 2.

Assuming that the levels of the output signals from photodetectors 18 and 20 are EB and ER respectively, logarithmic compression circuits 22 and 24 will output signals corresponding to log EB and log ER, respectively, and subtraction circuit 26 will output a signal corresponding to $$\log EB - \log ER = \log \frac{EB}{ER}$$

This means that the logarithmic expansion circuit 28 outputs the signal corresponding to EB/ER thereby providing a signal corresponding to the ratio between the blue and red components. If each gain at the gain adjustable amplifier 10 for the blue component and gain adjustable amplifier 8 for the red component is adjustable, a sufficiently balanced color component signal can be output to encoder 12.

However, since this video camera makes use of such a rule of a logarithmic calculation to obtain the ratio between two color components that subtraction between the respective logarithms of two values are equal to the logarithm of the ratio between the two values, the camera requires a circuit for the logarithmic compression of the electric signals corresponding to the intensities of two color components, a circuit which performs subtraction between the signals which have been logarithmically compressed and a circuit which performs logarithmic expansion of the signal obtained as the result of the subtraction. Thus, the circuit configuration becomes expensively complicated.

SUMMARY OF THE INVENTION

An object of the present invention is to provide a color component ratio detection circuit which is simple in configuration and can detect the color component ratio without logarithmic compression and logarithmic expansion.

Another object of the invention is to provide an automatic color temperature adjusting device for use in a video camera and employing the color component ratio detection circuit having the characteristics mentioned above.

The color component ratio detection device according to the present invention is provided with a current generating means for generating a current proportional to the intensity of the first color component intensity and a voltage generating means having a photoconductive element which detects the intensity of the second color component and is arranged such that the current generated by the current generating means flows therethough, the voltage generating means generating, across the photoconductive element, a voltage proportional to the ratio between the intensitives of the first and second color components.

In preferred embodiments of the first type color component ratio detection circuit according to the present invention the above mentioned voltage generating means is equipped with an operational amplifier wherein the photoconductive element for detecting the intensity of the second color component is connected between the inverting input terminal and output terminal of the amplifier as a negative feedback resistance. The current generating means includes a photoelectric converter element adapted for detecting the intensity of the first color component and is connected to the inverting input terminal of the operational amplifier such that current proportional to the intensity of the first color component flows into the photoconductive element. A photoconductive element may be used as the photoelectric converter element. The voltage proportional to the ratio of intensities of the first and second color components will be generated at the output terminal of the operational amplifier in this type of embodiment.

In preferred embodiments of the second type color component ratio detection circuit according to the present invention, the photoconductive element for detecting the intensity of the second color component constitutes the voltage generating means to which the current generating means feeds directly a substantially constant current and which is proportional to the intensity of the first color component. Here, the term "substantially" constant means that minor fluctuation of the current may be allowed. In a simplest form, such a current generating means may be composed of a photovoltaic element such as a photodiode which is connected in series with the photoconductive element for the detection of the intensity of the second color component to the power source to generate a current proportional to the intensity of the first color component.

When a photoconductive element is used as the photoconverter element for detecting the intensity of the first color component instead of the photovoltaic element, the current generating means is provided with a circuit which applies a constant voltage or a substantially constant voltage to the photoconductive element and a circuit which generates a current having an intensity equal to the current flowing through the photoconductive element. The photoconductive element for detecting the intensity of the second color component is serially connected to the latter circuit. It should be noted that in the second type preferred embodiments, the voltage proportional to the ratio of the intensities of the first and second color components will be derived from one end of the photoconductive element for the detection of the intensity of the second color component intensity, as a voltage drop by the photoconductive element.

When the color component ratio detection circuit is adapted for use with a video camera comprising a pickup tube, a color separation circuit for separating by colors the electric signal from the pickup tube, a gain-adjustable first amplifier which amplifies the color component signal proportional to the intensity of the first color component and supplied from the color separation circuit and gain-adjustable second amplifier which amplifies the color component signal proportional to the intensity of the second color component and supplied from the aforementioned color separation circuit. The color component ratio detection circuit constitutes an automatic color temperature adjusting device for achieving a proper white balance and which is connected to the first and second amplifiers such that the gains of those two amplifiers is controlled in accordance with the voltage proportional to the ratio of intensities of the first and second color components.

The color component ratio detection circuit according to the present invention is characterized by its simple construction which only requires the above current generating means and a voltage generating means without requiring complicated circuitry for logarithmic compression and logarithmic expansion.

These and other objects, features and advantages of the present invention will be more apparent from the following description of the preferred embodiments taken in conjunction with the accompanying drawings.

DETAILED DESCRIPTION OF PREFERRED EMBODIMENTS

The embodiments hereinafter described include an automatic color temperature adjusting device for use with an video camera and in the drawings of those embodiments, the same reference characters are used for the members which are equivalent or correspond to those shown in FIG. 1 and double description thereof will be avoided.

Figure 2:
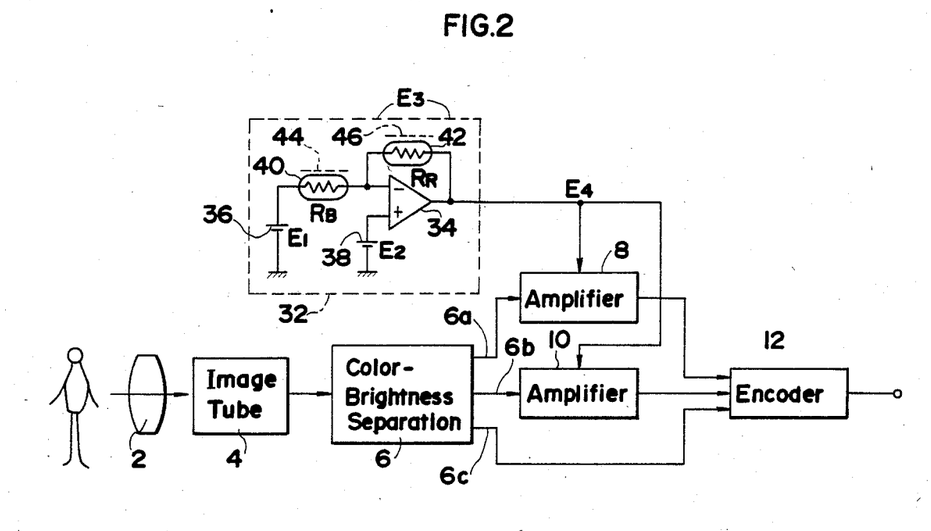
FIG. 2 shows one example of video camera circuitry equipped with an automatic color temperature adjusting device including a color component ratio detection circuit of the first type embodiment according to the present invention.

Referring now to FIG. 2 showing the first type embodiment mentioned above, circuit block 32 constitutes a color component ratio detection circuit comprising, as its components, an operational amplifier 34, constant voltage source 36 and 38 and photoconductive elements 40 and 42. Photoconductive element 40 is associated with a filter 44 which transmits only the blue component, while photoconductive element 42 is associated with a filter 46 which transmits only the red component. Photoconductive element 44 has one terminal connected to one terminal of constant voltage source 36 and the other terminal to an inverting input terminal of operational amplifier 34. Photoconductive element 42 is connected between the inverting input terminal and the output terminal of operational amplifier 34, thereby constituting a negative feedback resistance. It should be noted that Cds (Cadmium sulfide) may be used for photoconductive elements 40 and 42. A known constant voltage circuit comprising transistors, diode and resistance, etc., may be used for constant voltage sources 36 and 38.

Next, the operation of the color component ratio detection circuit with such configurations as mentioned above is described. Assuming now that the resistance values of photoconductive elements 40 and 42 are RB and RR respectively and the voltages of constant voltage sources 36 and 38 are E1 and E2 ($E1 > E2 > 0$) respectively, a current expressed by equation (1) below will flow through photoconductive element 40 across which voltage of $E1-E2$ is applied:

$$IB = \frac{E1 - E2}{RB} \quad (1)$$

This current IB will flow into photoconductive element 42, and a voltage expressed by equation (2) will be generated across photoconductive element 42:

$$E3 = I_B \cdot R_R \quad (2)$$

If equation (1) is applied, equation (2) will become:

$$E3 = \frac{RR}{RB}(E1 - E2) \quad (3)$$

Conversely, the resistance value of photoconductive elements 40 and 42 are expressed by equations (4) and (5) below:

$$RB = K \cdot LB^{-\gamma} \quad (4)$$

$$RR = K \cdot LR^{-\gamma} \quad (5)$$

Here, K, and LB and LR represent a proportion constant and incident light intensities respectively. If equations (4) and (5) are applied, equation (3) will become as below, showing a voltage signal corresponding to the ratio of the intensities of the two color components:

$$= \frac{LR^{-\gamma}}{LB^{-\gamma}} \cdot (E1 - E2) \quad (6)$$

$$= \left(\frac{LB}{LR}\right)^{\gamma} \cdot (E1 - E2)$$

Assuming that an output voltage at the output terminal of operational amplifier 34 is E4, the relationship of $E4 = E2 - E3$ will be established, hence:

$$E4 = E2 - \left(\frac{LB}{LR}\right)^{\gamma} \cdot (E1 - E2) \quad (7)$$

Here, the γ value of photoconductive elements 40 and 42 and the voltage values of constant voltage sources 36 and 38 are determined taking into account the performances of gain adjustable amplifier 8 for the red component and gain adjustable amplifier 10 for the blue component which receive voltage signal E4 and other circuit design considerations.

For example, if the voltage of constant voltage source 38 is 0 volt, equation (7) will become:

$$E4 = -\left(\frac{LB}{LR}\right)^{\gamma} \cdot E1 \quad (8)$$

Assuming the constant voltage E1 of constant voltage source 36 is set to a positive value, output voltage E4 will be negative. Consequently, in this case, a negative power source may required for 38. When constant voltages E1 and E2 are determined to be proper positive voltages, output E4 can be set to a positive voltage, permitting the circuit to operate with only positive power sources. Meanwhile, although the photoconductive element with γ values of approximately 0.5-1 are generally available, any value in the range can be utilized for photoconductive elements 40 and 42. Note that in order to match output E4 with the control characteristics of amplifiers 8 and 10, if required, output E4 may be given via a non-linerar circuit having the required characteristics.

The embodiment circuit described above with reference to FIG. 2 is suitable for use when the illumination light sources are either sunlight or tungsten lamp light.

Figure 3:
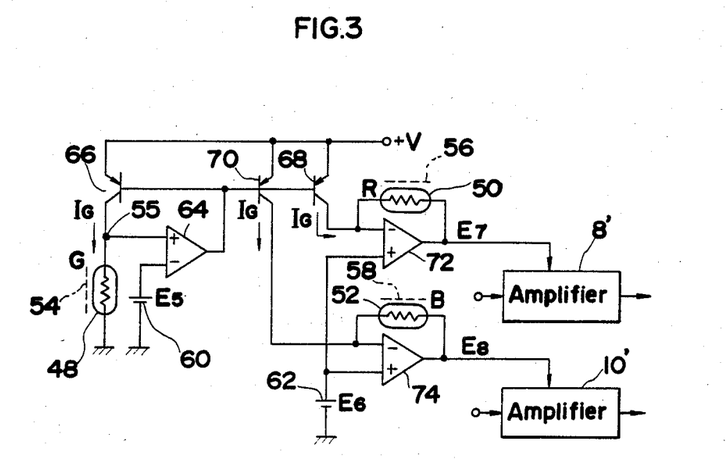
FIG. 3 is a circuit diagram showing an exemplary application where the embodiment circuit in FIG. 2 is adapted for use with the illumination of a fluorescent lamp.

Next, description will be made about an exemplary modification of the embodiment circuit illustrated in FIG. 2 wherein the circuit is modified such that it is applicable even when the illumination light source is a fluorescent lamp. In order to attain the white balance for the fluorescent lamp light source, detection of three-color components of red (R), green (G) and blue (B) is a prerequisite as is known in the art. In FIG. 3, photoconductive elements 48, 50 and 52 receive the light components of green, red and blue respectively, and filters 54, 56 and 58 having required characteristics are arranged on the light receiving surface thereof, respectively. A circuit comprising a photoconductive element 48, a constant voltage source 60, an operational amplifier 64 and transistors 66, 68 and 70 are provided for outputting, from the collectors of transistors 68 and 70, a current equal to current IG corresponding to the intensity of the green color component and flowing from photoconductive element 48. One terminal of photoconductive element 48 is connected to the collector of transistor 66, and their junction point 55 is connected to the non-inverting input of operational amplifier 64.

The inverting input of operational amplifier 64 is connected to the positive voltage outputting point of constant voltage source 60, and the output of the amplifier is connected to the base of transistor 66. Note that each base of transistor 68 and 70 is also connected to the base of transistor 66. Transistors having equal characteristics to each other are used for those three transistors. With the circuit configuration as described above, the voltage at junction point 55 is maintained at a level the same as that of output voltage E5 of constant voltage source 60 by virtue of the negative feedback performance of operational amplifier 64. Thus, a constant voltage E5 will be applied across photoconductive element 48. Assume that the resistance value of photoconductive element 48 is $R_G$, current IG running therethrough can be expressed by following equation (9):

$$IG = \frac{E5}{RG} \quad (9)$$

Next, a circuit comprising photoconductive elements 50 and 52, constant voltage source 62, and operational amplifiers 72 and 74 provides signals representing the ratio LG/LR of the intensities of the green and red color components of the light and the ratio LG/LB of the intensities of the green and red color components. The non-inverting inputs of both operational amplifiers 72 and 74 are connected to the positive voltage outputting point of constant voltage source 62, and photoconductive elements 50 and 52 are connected in each negative feedback passage. Current IG shown in equation (9) is supplied from transistors 68 and 70 to each photoconductive element of 50 and 52. In the device configuration mentioned above, assuming that the resistance value of photoconductive element 50 is RR, and the output voltage of operational amplifier 72 is E7, and equation (10) below can be established:

$$IG = \frac{E6 - E7}{RR} \quad (10)$$

Hence, the following equation (11) is obtained using equations (9) and (10).

$$E7 = E6 - \frac{RR}{RG} E5 \quad (11)$$

Similarly, if the resistance value of photoconductive element 52 is RB and an output voltage of operational amplifier 74 is E8, equation (12) below is obtained:

$$E8 = E6 - \frac{RB}{RG} E5 \quad (12)$$

Further, if the illuminance on, i.e., the intensities of the light incident upon photoconductive elements 48, 50 and 52 are LG, LR and LB respectively, output voltages E7 and E8 will be shown with reference to the illuminances in the same manner as that in the case of the first embodiment, by equations (13) and (14) below:

$$E7 = E6 - \left(\frac{LG}{LR}\right)^\gamma \cdot E5 \quad (13)$$

$$E8 = E6 - \left(\frac{LG}{LB}\right)^\gamma \cdot E5 \quad (14)$$

As shown in equations (13) and (14) output voltages E7 and E8 are represented by the signals corresponding to the ratio LG/LR between the green and red color components and the ratio LG/LB between the green and blue color, respectively.

Voltage signals E7 and E8 thus obtained will be given as the control inputs to gain adjustable amplifiers 8' and 10' for the red and blue components, respectively. Each amplifier 8' and 10' is controlled in such a way that when the green color component proportion becomes larger than that of the red color component and blue color component, the amplifying rate will be increased to maintain a proper white balance.

It should be noted that in FIG. 3, when photoconductive elements 50 and 52 have the characteristics of $\gamma = 1$, a photodiode can be used instead of photoconductive element 48.

Figure 4:
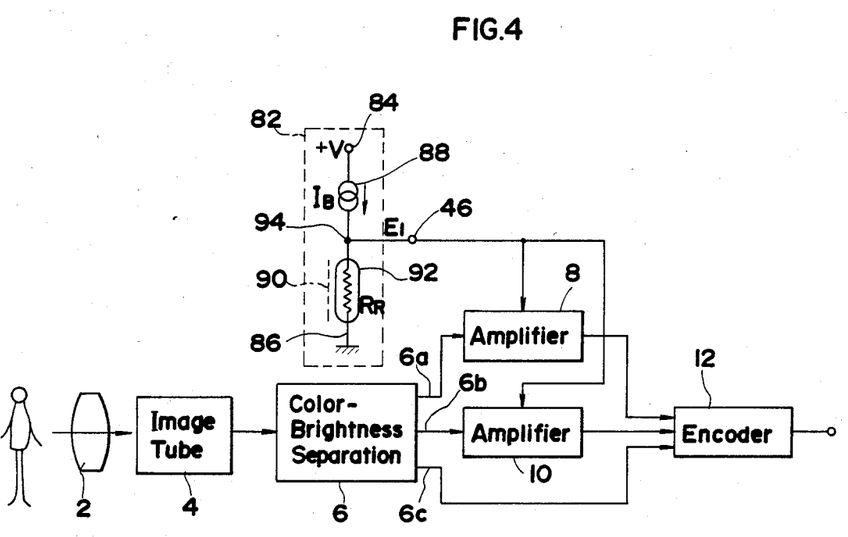
FIG. 4 is a circuit diagram showing a basic configuration of the color component ratio detection circuit of the second type embodiment according to the present invention, and an example of video camera circuitry including an automatic color temperature adjusting device utilizing the second type.

In FIG. 4 which illustrates basic configurations of the second type embodiment, circuit block 82 constitutes a color component ratio detection circuit which detects the ratio of intensities of two color components, for example, red and blue. In the block 82, constant current source 88 and photoconductive element 92 are connected in series with each other between ground terminal 86 and terminal 84 which receives a DC voltage from a power source (not shown). Current source 88 outputs current IB corresponding to the light intensity of the blue component. Photoconductive element 92 receives the light through filter 90 which transmits only the red light. Note that a definite configuration of current source 38 will be described later referring to the other Figures. Junction point 94 between current source 88 and photoconductive element 92 is connected to terminal 46 which outputs a voltage signal representing the color component ratio. Now, assuming that the resistance value of photoconductive element 92 is RR, output voltage E1 delivered to terminal 46 is shown by equation (15) below:

$$E1 = IB \cdot RR \quad (15)$$

A relationship expressed by equation (16) below will be established between resistance value R of a photoconductive element and illuminance L which is received by the photoconductive element.

$$R = KL^{-\gamma} \quad (16)$$

Wherein K and $\gamma$ are the constants inherent to the photoconductive element. For $\gamma$, a value of between 0.5 and 1 is generally available.

Now, if the resistance value RR of photoconductive element 92 is $RR = K1 \, LR^{-\gamma}$, and if the resistance value is substituted in equation (15), output E1 will be changed as shown by equation (17) below:

$$E1 = K1 \frac{IB}{L_R{}^\gamma} \quad (17)$$

wherein, K1 represents a constant and LR represents an illuminance of the red color component received by photoconductive element 92.

Figure 5:
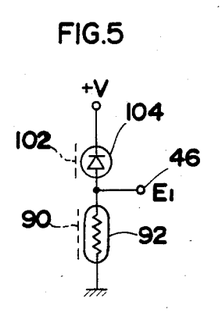
FIGS. 5-8 are circuit diagrams showing several different specific circuit embodiments of the color component ratio detection circuitry shown in FIG. 4.

First, description will be made of the case where photodiode 104 is used as current source 88 as illustrated in FIG. 5. Filter 102 which transmits only the blue color component of light is arranged in front of the light receiving plane of photodiode 104. Generally, photoelectric current I generated by a photodiode is proportional to the illuminance L thereon and hence, equation (18) below is established:

$$I = CL \quad (18)$$

wherein C is a constant. Assuming that the illuminance of a blue color component on photodiode 104 is LB and photoelectric current generated in response to the illuminance is IB, the current IB is expressed by equation (19) below:

$$IB = C1 \cdot LB \quad (19)$$

wherein C1 is a constant. If a photoconductive element having characteristics of $\gamma = 1$ is used in the circuit of FIG. 5, equation (20) can be derived from equations (17) and (19) for expressing E1:

$$E1 = C1 \cdot K1 \cdot \left(\frac{LB}{LR}\right) \quad (20)$$

As seen from equation (20), output E1 shows the ratio (LB/LR) of the illuminances of two color components of light.

The circuit in FIG. 5 shows an example of color component ratio detection circuit 82 having the most simple circuit configuration. Photodiode 104 may be replaced by a phototransistor. Further, the circuit may be configured such that photodiode 104 is connected not directly but indirectly to photoconductive element 92 as will be described later.

Figure 6:
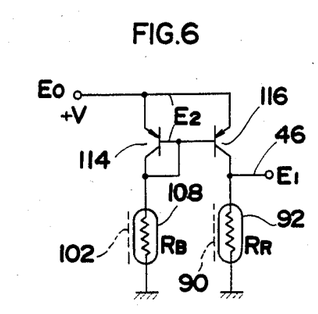

FIG. 6 shows an example of color component ratio detection circuit 82 which is designed to obtain the illuminance data for the blue and red components of light by means of photoconductive elements 108 and 92, respectively. Filters 102 and 90 transmit only the blue and red components, respectively. Transistor 114 has its base and collector connected with each other to form a diode. Transistor 116 is connected such that the base-emitter voltage of transistor 114 will be applied across the base-emitter of transistor 116. Transistor 116 provides from its collector to photoconductor element 92 a current which is approximately proportional to the collector current of transistor 114.

Especially, if transistors 114 and 116 have the same characteristics with each other, the collector current of both transistors will be substantially equal. Photoconductive element 108 and transistors 114 and 116 together form current source 88 shown in FIG. 4. Photoconductive element 108 may change its resistance value depending upon the incident light intensity thereby varying the current flow but there may be only a small amount of fluctuation in the voltage across the photoconductive element 108 which can be regarded as substantially constant. Now, assuming that a power supply voltage is $E_0$ and the voltage across the base-emitter of transistor 114 is E2, voltage E3 to be applied to photoconductive element 108 may be E0−E2. The base-emitter voltage E2 is, for example, approximately 0.5 V and may vary between approximately ±0.1 V at most depending upon the light incident on photoconductive elements 108.

Assuming that a power supply voltage E0 is, for example, 5 V, voltage E3 to be applied to photoconductive element 108 may be approximately 4.5 V. Resistance value RB of photoconductive element 108 is shown by equation (21) below:

$$RB = K2 \cdot LB^{-\gamma} \tag{21}$$

wherein, K2 is a constant and LB is the illuminance of the blue light component received by photoconductive element 108. Current IB flowing through this photoconductive element 108 is:

$$IB = \frac{E3}{RB} \tag{22}$$

$$= \frac{E3}{K2} \cdot L_B{}^{\gamma}$$

For transistors 114 and 116, transistors having a sufficiently large D.C. amplification ratio ($h_{FE}$) are used. Also, assuming that the ratio of the emitter area of transistor 116 to that of transistor 114 is n, collector current I'B of transistor 116 will be n times as much as the current IB running through photoconductive element 108.

When the characteristics of transistors 114 and 116 are the same with each other, n=1 and I'B=IB.

In this case, if photoconductive elements 108 and 92 are designed to provide the same resistance value for the same illuminance, it sometimes occurs that transistor 116 may be saturated, when light of a larger illuminance than that on photoconductive element 90 is incident upon photoconductive element 108. This can be avoided by making the emitter area of transistor 116 smaller as compared with that of transistor 114, namely, n<1, or by making the light receiving area of photoconductive element 108 smaller than that of photoconductive element 92.

Voltage E generated across photoconductive element 92 under such conditions can be expressed by equation (23) below:

$$E1 = I'_B \cdot R_R \tag{23}$$

$$= (n \cdot I_B) \cdot (K3 \cdot L_R^{-\gamma})$$

$$= \frac{nK2}{K3} \left( \frac{LB}{LR} \right)^{\gamma} E3$$

wherein, it is assumed that K3 is a constant with respect to photoconductive element 92 and $\gamma$ is equal to that of photoconductive elements 108. As seen from equation (23), the circuit in FIG. 6 can provide data LB/LR which is a ratio between two color components of light.

Figure 7:
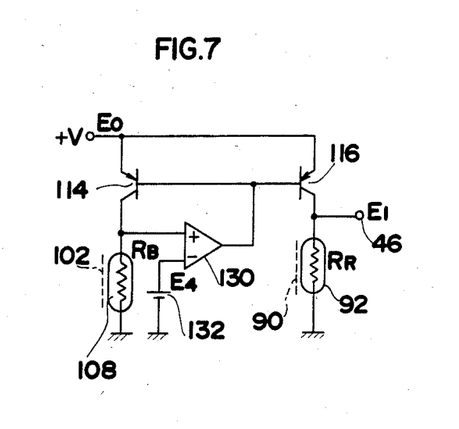

The circuit in FIG. 7 corresponds to a circuit wherein operational amplifier 130 and constant voltage source 132 are added between the base-collector of transistor 114 in the circuit of FIG. 6. The circuit in FIG. 7 is designed such that the voltage applied to photoconductive element 108 is equal to voltage E4 generated by constant voltage source 132. The voltage E4 can be set to a desired value within a range of a value smaller than power supply voltage E0, and is stable against fluctuations in power supply voltage E0, resulting in an improved output signal accuracy compared with that of the circuit in FIG. 6. Output signal E1 obtained from output terminal 46 can be shown in equation (24) in the same manner as previously described.

$$E1 = \frac{nK2}{K3} \cdot \left( \frac{LB}{LR} \right)^{\gamma} \cdot E4 \tag{24}$$

In this case if transistors 114 and 116 have the same characteristics with each other and photoconductive elements 108 and 92 have the same characteristics and the same light receiving conditions with each other, equation (24) can be expressed by equation (25) below:

$$E1 = \left( \frac{LB}{LR} \right)^{\gamma} \cdot E4 \tag{25}$$

It should be noted that when photoconductive element 92 having the characteristics of $\gamma = 1$ is used, a photodiode can be used instead of photoconductive element 108.

Figure 8:
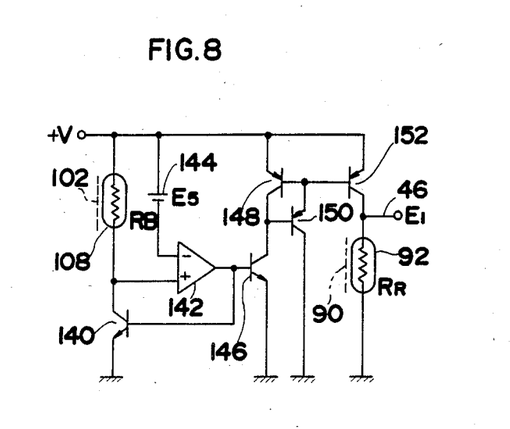

Next, FIG. 8 shows an exemplary modification of the circuit in FIG. 7. In the circuit of FIG. 7, PNP transistor 114 was serially connected with photoconductive element 108, but in the circuit of FIG. 8, PNP transistor 140 is serially connected with photoconductive element 108. Transistors 146, 150 and 152 together compose a mirror circuit wherein a current proportional to the collector current of transistor 148 is output from the collector of transistor 152. When transistors 148 and 152 have the same characteristics with each other, the collector currents of transistors 148 and 152 are the same. Note that, although the base and collector of transistor 148 may be directly connected with each other as in the case of transistor 114 in FIG. 6, it will be prevented that the total of base current of transistors 148 and 152 flows into the collector of transistor 146 whereby adverse effects caused by the base current as a noise component may be eliminated, if the base and collector of transistor 148 are connected via transistor 150.

Now, in FIG. 8, since voltage E5 of constant voltage source 144 is applied to photoconductive element 108, current IB flowing into photoconductive element 108 is E5/RB. Now, assuming that transistors 140 and 146 have the same characteristics with each other, the collector current of both transistors may be the same as IB. Assuming that transistors 148 and 152 have the same characteristics with each other, a current equal to current IB which runs through photoconductive element 108 will eventually flow into photoconductive element 92. At this time, voltage signal E1 which will be output from terminal 46 can be expressed by equation (26) below:

$$E1 = \left(\frac{LB}{LR}\right)^\gamma E5 \quad (26)$$

It should be noted that transistors 140 and 146 do not necessarily have the same characteristics and the same can also apply to transistors 148 and 152 as well.

Figure 9:
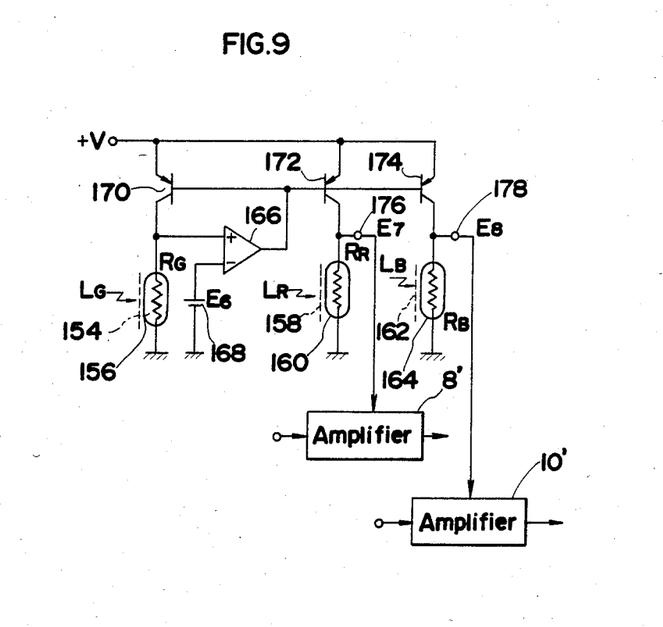
FIG. 9 is a circuit diagram showing an exemplary application of the color component ratio detection circuit in FIG. 7 to a case utilizing a fluorescent lamp illumination.

The circuit illustrated in FIG. 9 shows an example of application of the color component ratio detection circuit in FIG. 7, which is applicable when a fluorescent lamp is used as a light source for illuminating the object. As previously described, in order to attain the white balance to the fluorescent lamp light source, the detection of illuminance of three color components of red (R), green (G) and blue (B) is a prerequisite. In FIG. 9, filters 154, 158 and 162 transmit green, red and blue color components of light, respectively. Photoconductive elements 156, 160 and 164 received the color components of green, red and blue respectively. The circuit configuration of FIG. 9 is substantially the same as that of the circuit in FIG. 7. The only difference is that the circuit in FIG. 7 obtains data of only one type of the ratio (LB/LR), while the circuit in FIG. 9 is provided with additional circuit elements for obtaining data of two types of the ratios (LG/LR) and LG/LB).

Now, assuming that the voltage of constant voltage source 168 is E6, voltage signals E7 and E8 output from output terminals 176 and 178 respectively can be expressed by equations (27) and (28) below:

$$E1 = A1\left(\frac{LG}{LR}\right)^\gamma E6 \quad (27)$$

$$E8 = A2\left(\frac{LG}{LB}\right)^\gamma E6 \quad (28)$$

wherein A and A2 are constants determined in accordance with the characteristics of transistors 170, 172 and 174, and the conditions of the arrangement of photoconductive elements 156, 160 and 164. Note that, since equations (27) and (28) can be easily derived by referring to the description with reference to the illustration in FIG. 7, description of the processes for deriving the equations are omitted.

Voltage signals E7 and E8 thus obtained are applied to the control input of gain adjustable amplifier 8' for the red component and gain adjustable amplifier 10' for the blue component respectively.

Each amplifier 8' and 10' is controlled such that their amplification ratio will be increased when the portion occupied by the green color component becomes larger as compared with that of the red and blue color components thereby maintaining the white balance. It will be apparent that, as seen from the above, a similar variation or modification which has been achieved to the circuits shown before FIG. 9 can be easily applied to the circuitry in FIG. 9. It is also apparent that various variations other than that described in detail or shown in the diagrams can also be achieved without deviating from the essence of the present invention.

I claim:

1. A color component ratio detection circuit comprising:
   means for generating a current proportional to the intensity of a first color component of light; and
   a voltage generating means including a photoconductive element which detects the intensity of a second color component of the light and electrically connected such that the current generated by said current generating means flows therethrough, said voltage generating means generating, across said photoconductive element, a voltage proportional to the ratio between the intensities of said first and second color components.

2. A color component ratio detection circuit as defined in claim 1, wherein said current generating means includes a photoelectric element which detects the intensity of said first color component, and said voltage generating means further includes an operational amplifier having inverting and non-inverting input terminals and an output terminal and a first constant voltage source connected to said non-inverting input terminal, said photoconductive element being connected between said output terminal and said inverting input terminal as a negative feedback resistor with said photoelectric element being connected to said inverting input terminal such that said current flows into said photoconductive element, whereby said voltage across said photoconductive element appears at said output terminal.

3. A color component ratio detection circuit as defined in claim 2, wherein said current generating means further includes a second constant voltage source and said photoelectric element consists of a photoconductive element connected in series with said second constant voltage source.

4. A color component ratio detection circuit as defined in claim 3, wherein the voltage generated by said second constant voltage source is higher than that generated by said first constant voltage source and both said voltages are set to be positive.

5. A color component ratio detection circuit as defined in claim 1, wherein said photoconductive element constitutes said voltage generating means to which said current generating means feeds said current directly.

6. A color component ratio detection circuit as defined in claim 5, wherein said current generating means includes a constant current source for generating a substantially constant current proportional to the intensity of said first color component.

7. A color component ratio detection circuit as defined in claim 6, wherein said constant current source includes a photovoltalic element connected in series with said photoconductive element.

8. A color component ratio detection circuit as defined in claim 6, wherein said constant current source includes a photoconductive element for detecting the intensity of said first color component, a first transistor whose base and collector are connected with each other to form a diode and whose collector is connected with said photoconductive element for detecting the intensity of said first color component, and a second transistor whose base and emitter are connected with the base and emitter of said first transistor respectively and whose collector is connected with said photoconductive element for detecting the intensity of said second color component.

9. A color component ratio detection device as defined in claim 6, wherein said constant current source includes a photoconductive element for detecting the intensity of said first color component, a first transistor whose collector is connected with said photoconductive element for detecting the intensity of said first color component, a constant voltage source, an operational amplifier having an input terminal connected to a junction between the collector of said first transistor and said photoconductive element for detecting the intensity of said first color component, another input terminal connected to said constant voltage source and an output terminal connected to the base of said first transistor, and a circuit means for producing a substantially constant current commensurate with the voltage across the base and emitter of said transistor as said current proportional to the intensity of said first color component, said circuit means being connected with said current into said photoconductive element for detecting the intensity of said second color component.

10. In a video camera which includes an image or pickup tube for generating an image signal, a color separation circuit for separating first and second color component signals from said image signal, a first gain-adjustable amplifier which amplifies said first color component signal, a second gain adjustable amplifier for amplifying said second color component signal and an encoder for converting said first and second color component signals fed from said first and second gain-adjustable amplifiers into video signals, an automatic color temperature adjusting device comprising:

means for generating a current proportional to the intensity of said first color component; and a voltage generating means including a photoconductive element which detects the intensity of said second color component and electrically connected such that the current generated by said current generating means flows therethrough, said voltage generating means generates, across said photoconductive element, a voltage proportional to the ratio between intensities of said first and second color components and being connected with said first and second gain adjustable amplifiers such that the gains of said first and second gain adjustable amplifiers are adjusted in accordance with said voltage to achieve automatic white balance.

* * * * *